United States Patent [19]
Poteralski et al.

[11] Patent Number: 6,095,495
[45] Date of Patent: Aug. 1, 2000

[54] REMOTE CONTROL OF A VALVE

[75] Inventors: John F. Poteralski; Carl J. Ruffalo, both of Watertown, N.Y.

[73] Assignee: New York Air Brake Corporation, Watertown, N.Y.

[21] Appl. No.: 09/313,384

[22] Filed: May 18, 1999

Related U.S. Application Data

[63] Continuation-in-part of application No. 09/211,014, Dec. 15, 1998.

[51] Int. Cl.$^7$ ............................................. F16K 31/46
[52] U.S. Cl. ........................ 251/293; 137/348; 137/349
[58] Field of Search .................................. 137/345, 347, 137/348, 349, 350; 251/293

[56] References Cited

U.S. PATENT DOCUMENTS

| | | | |
|---|---|---|---|
| 201,996 | 4/1878 | Connolly | 251/293 X |
| 300,501 | 6/1884 | Payne | 251/293 X |
| 755,918 | 3/1904 | Niederlander | 137/348 |
| 839,878 | 1/1907 | Niederlander | 137/348 |
| 935,856 | 10/1909 | O'Meara | 251/293 X |
| 1,002,370 | 9/1911 | Curtis | 137/347 |
| 1,070,838 | 8/1913 | Olson | 137/349 |
| 1,393,882 | 10/1921 | Cornell | 137/349 |
| 1,396,540 | 11/1921 | Stiglitz | 251/293 |
| 2,577,230 | 12/1951 | Moore | 251/293 X |
| 3,582,116 | 6/1971 | Young | 251/293 X |
| 4,069,836 | 1/1978 | Sowinski | 137/348 |
| 4,099,702 | 7/1978 | Temple . | |
| 5,478,142 | 12/1995 | LaLone et al. . | |
| 5,482,251 | 1/1996 | Roberts | 251/293 X |
| 5,544,854 | 8/1996 | Carroll . | |

*Primary Examiner*—John Rivell
*Attorney, Agent, or Firm*—Barnes & Thornburg

[57] ABSTRACT

A conversion or extension kit to be used with standard valves using standard elements to provide access to a manual valve at the side of the pipe bracket. The valve mounted to the pipe bracket includes a stem connected to the valve element and having a key. A handle has an opening for mating with a key. An extension shaft is provided having a first end for mating with the key of the stem and having a second end for mating with the opening of the handle. An additional bracket or handle bracket is provided and mounted to the control valve directly or via the manual valve. The extension shaft is pivotally mounted to the handle bracket.

11 Claims, 6 Drawing Sheets

REMOTE CONTROL OF A VALVE

This application is a Continuation-In-Part application of application Ser. No. 09/211,014, filed Dec. 15, 1998, currently pending.

BACKGROUND AND SUMMARY OF THE INVENTION

The present invention relates generally to brake control valves for the air brakes of a vehicle and more specifically to an improvement of access to a manual valve on pipe brackets.

In recent years, single sided pipe brackets have been introduced into the United States Rail Industry. The present design used is illustrated in FIGS. 1 and 2 and described in detail in U.S. Pat. No. 5,544,854. A pipe bracket 2 is mounted to a car body 4 by a pair of identical mounting brackets or pedestals 6 and 7. Fasteners 10 connect the mounting legs 8 of the pedestal to the car body. The pipe bracket 2 is mounted to the pedestal by bolts 12. A front face 14 of the pipe bracket 2 receives the control valve service portion 16 and the emergency portion 18 in a side-by-side relationship. The back face 20 of the pipe bracket receives the typical piping required to bring air to and to direct air from the respective control valve service and emergency portions. A cut out cock or valve 22 is mounted to the back face of the pipe bracket 2. The cut out valve 22 includes a ball valve rotatable through an angle of approximately 90 degrees to establish an open and close position of the cut out valve. The rotation is controlled by a lever or handle 24 which hangs vertically from its connection with the cut out valve in the open position and is disposed horizontally in the closed position.

Because the cut out valve 22 is mounted and displaced from the side of the pipe bracket 2, access to the handle 24 requires the operator to reach below the pipe bracket to operate the handle. To alleviate this problem or provide access from the front, a handle operating mechanism 26 is described specifically in U.S. Pat. No. 5,544,854.

The stem of the cut out valve 22, extending exterior of the body and connected to the valve element, is not standard in that it is drilled and tapped to accept a cap screw to attach the L-shaped handle 24 to the stem. This makes the cut out valve non-standard. In the event the cut out valve becomes broken and needs replacing, it cannot be substituted and used with the handle operating mechanism 26 since the stem is not drilled and tapped. The U.S. Rail Industry demands commonality in their products to ensure that loaded freight cars are not stranded by non-common parts.

It should also be noted that the handle operating mechanism 26 when viewed from the front is an extended or non-extended position for its open and closed positions. This is different than the vertical when open and horizontal when closed standard for these valves. Thus, making it acceptable to visual misinterpretation of its position. It should also be noted that the handle operating mechanism 26 is located in a cramped position between the emergency portion vent, the bottom of the pipe bracket 2 and the pedestal 7 and mounting lugs 8. Further reference to the other detail of this prior art device should be made to the U.S. Pat. No. 5,544,854.

Realizing that access to the handle of the dirt collector and cut-off valve was inconveniently located, another design of a single sided pipe bracket was developed and described U.S. Pat. No. 5,478,142. The cut-off valve was mounted on the back face adjacent to the side of the pipe bracket thereby allowing access to the operating handle of the cut-off valve adjacent the side of the pipe bracket. This particular design was not the design adopted by the industry. The design of FIGS. 1 and 2 was.

The present invention is to provide a conversion or extension kit to be used with standard manual valves using standard elements to provide access to a manual valve at the side of the pipe bracket. The manual valve mounted to the pipe bracket includes a stem connected to the valve element and having a key. A handle has an opening for mating with a key. An extension shaft is provided having a first end for mating with the key of the stem and having a second end for mating with the opening of the handle. This allows use of the standard valve and standard handle with an extension shaft therebetween.

The extension shaft is configured such that the second end extends past the side of the bracket. This provides access to the handle at the side of the pipe bracket. The extension is configured such that the handle assumes the same open and closed positions mated to the shaft as it would mated to the stem.

An additional bracket or handle bracket is provided and mounted to the control valve. The extension shaft is pivotally mounted to the handle bracket. The handle bracket is mounted to control valve by fasteners which are already present on the control valve. The handle bracket may be mounted to the control valve by fasteners that connect the pipe bracket to the mounting bracket. Alternatively, the handle bracket may be mounted to the control valve by fasteners that connect the mounting bracket to the vehicle. As a third alternative, the handle bracket may be mounted to the control valve by fasteners that connect the manual valve to the pipe bracket. As a fourth alternative, the handle bracket may be mounted to the manual valve by fasteners that connect the cover of the manual valve to the body of the manual valve and thus to the control valve. This stabilizes the extension shaft.

As an alternative, an L-shaped handle may be provided, which also has an opening to be mated with the second end of the shaft. The L-shaped handle extends from the second end of the shaft towards the pipe bracket. This provides access closer to the front face of the pipe bracket.

The extension shaft, with or without the handle bracket, may be provided as a kit to retrofit on existing dirt collector and cut-off valves or may be provided as part of a new brake control valves which has the standard dirt collector and cut-off valve mounted to a back face.

Although the extension has been designed for the dirt collector and cut-off valve or cock on the single sided pipe bracket, the invention of using an extension shaft, which mates pre-existing stems of the manually operated valve with its handle and if needed a handle bracket, can be used on any valve on a railroad brake system.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 3:
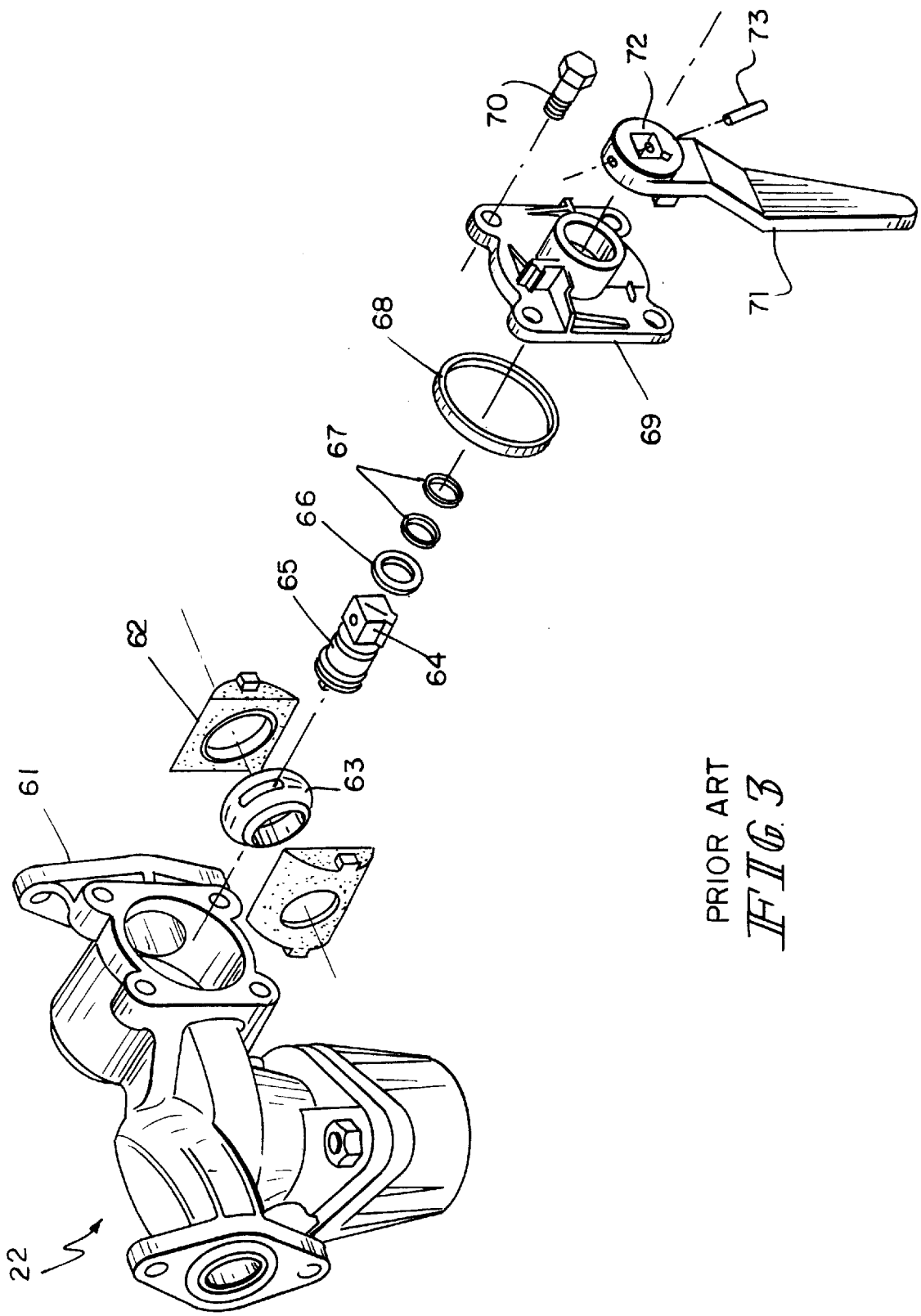
FIG. 3 is an exploded view of a cut-off valve of the prior art.

To better understand the standard dirt collector and cut-off valve 22, reference is made to FIG. 3. The cut-off valve 22 includes a body 61 and a valve element 63 received in the body 61 between seats 62. A stem 65 is connected to the valve element 63 and includes a key 64. A washer 66 and O-ring seal 67 are provided on the stem 65. A gasket 68 is positioned between the body 61 and the cover 69 which is secured to the body 61 by fastener 70. The standard handle 71 includes an opening 72 which mates with the key 64. A pin 73 extends through the handle 71 and the key 64 to secure the handle 71 to the key 64, stem 65 and consequently valve element 63. With respect to the present invention, the elements are configured to mate with the key 64 and the opening 72 of a standard cutoff valve. It should also be noted that although the present invention is described with reference to the cut-off valve, it may be used with other manual valve structures which are mounted to the pipe bracket or a part of a brake system wherein the handle is not readily assessable.

Figure 1:
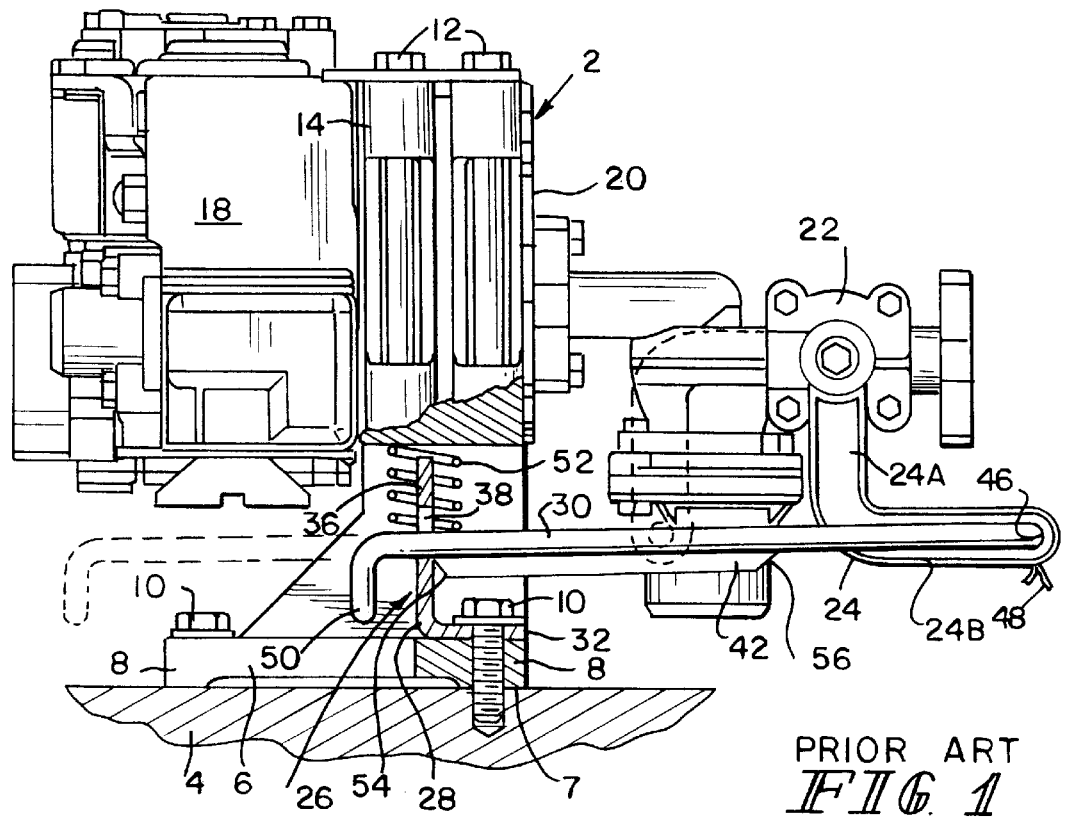
FIG. 1 is a side view of a single sided pipe bracket and control valve with the handle operating mechanism of the prior art.
Figure 2:
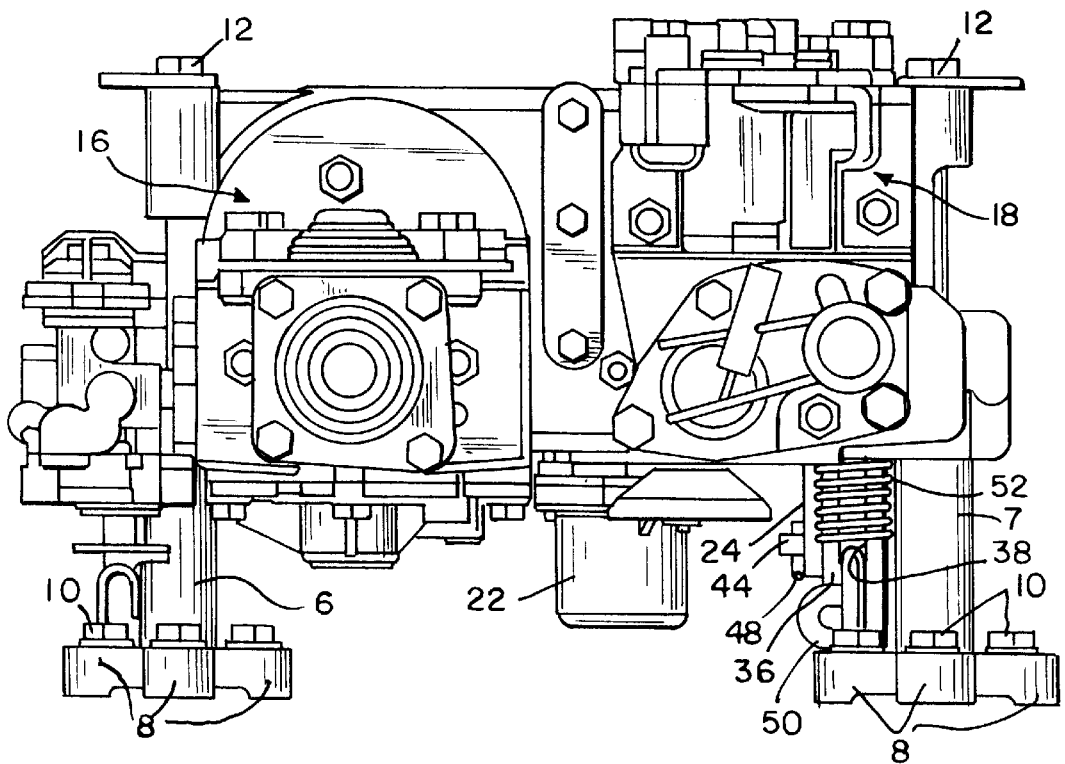
FIG. 2 is a front view of the prior art control valve of FIG. 1.
Figure 4:
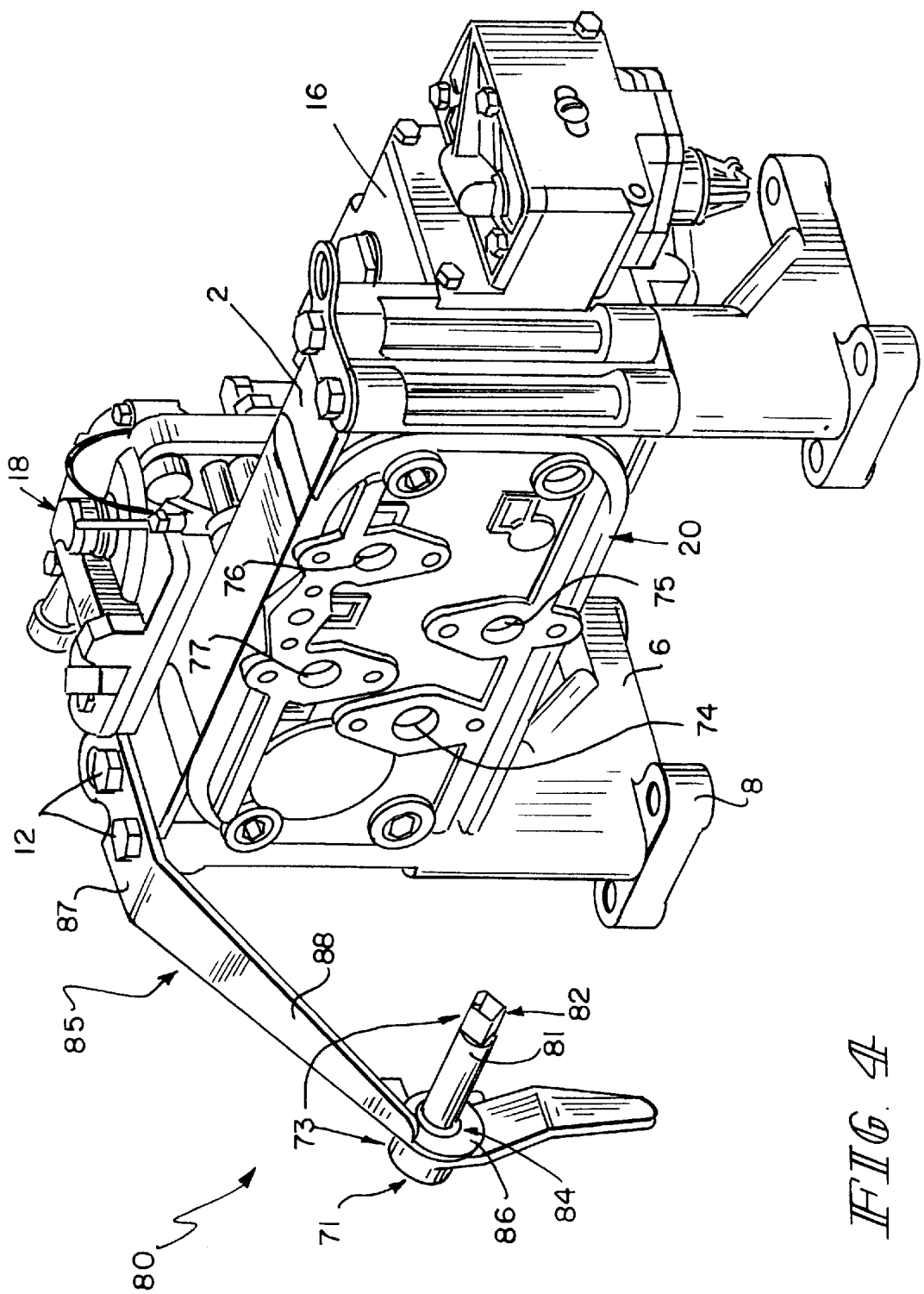
FIG. 4 is a perspective view of a control valve with a single sided pipe bracket (cut-off valve removed) with the extension kit mounted to the pipe bracket according to the principles of the present invention.
Figure 5:
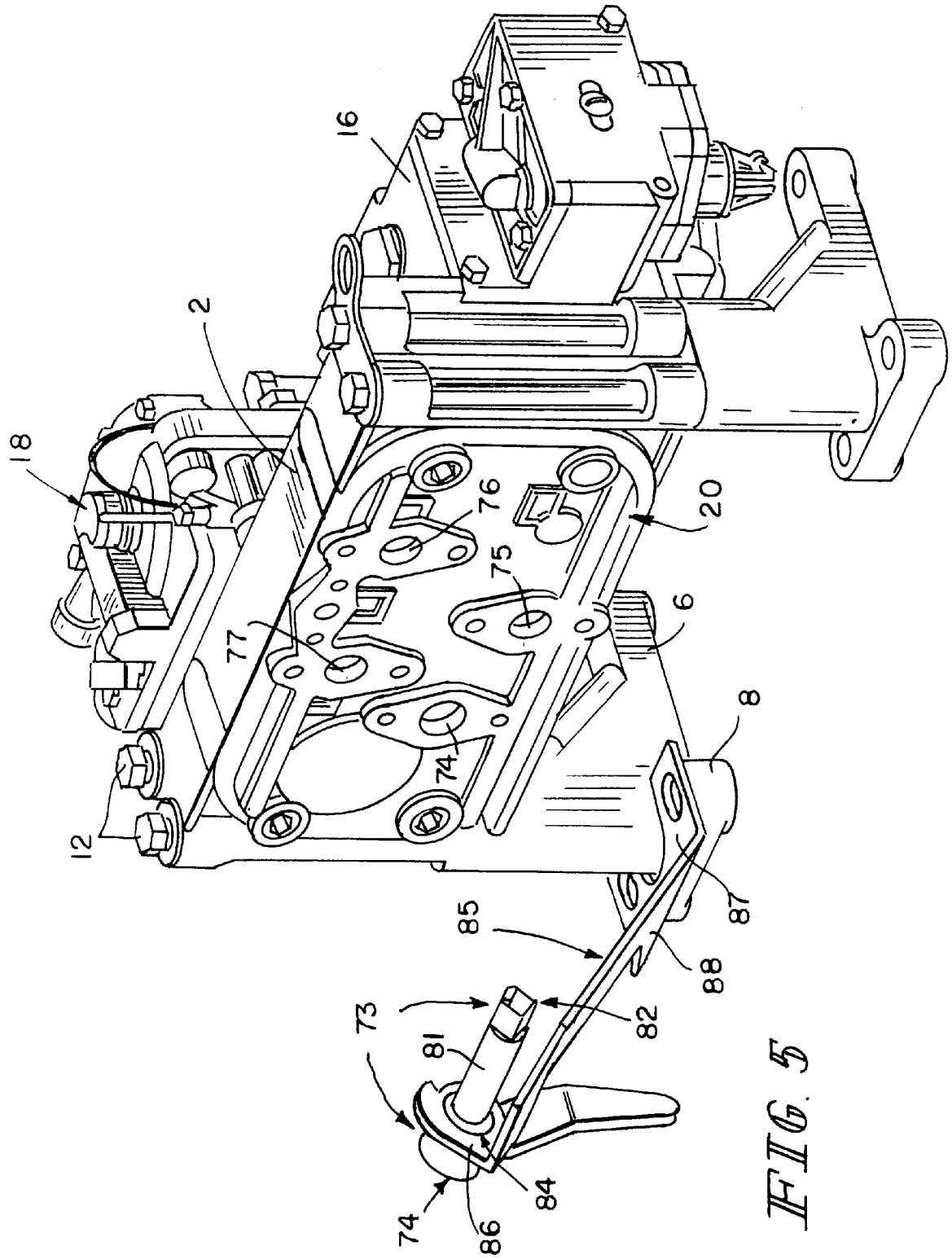
FIG. 5 is a perspective view of a pipe bracket with the extension kit mounted to a mounting bracket according to the principles of the present invention.
Figure 6:
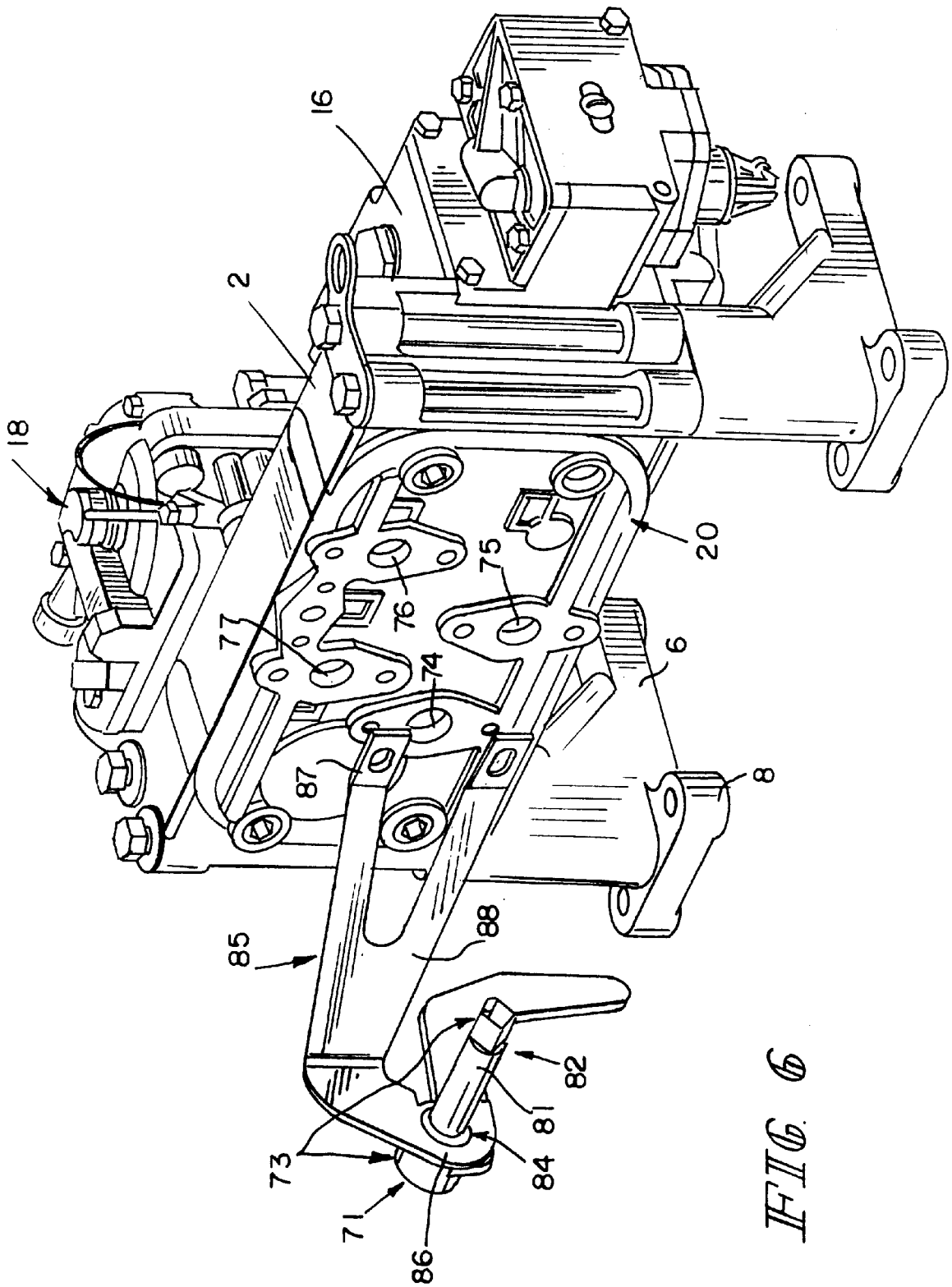
FIG. 6 is a perspective view of a pipe bracket with the extension kit mounted to a face of the pipe bracket according to the principles of the present invention.

In FIGS. 4–6, the elements which are common to the prior art of FIGS. 1–3 are used in FIGS. 4 and 5. The back face 20 of the pipe bracket is shown with none of the connections, including the cut-off valve 22. The port 74 is the port in the back face 20 for the cut-off valve. Port 75 is the brake cylinder port, port 76 is the emergency reservoir pipe port, and port 77 is the auxiliary reservoir port.

Referring to FIG. 4, the extension kit 80 includes an extension shaft 81 having a first end 82 configured to mate with the key 64 of the standard manual valve. The second end of the shaft 81, not shown, is configured to mate with the opening 72 of the standard handle 71. Pins 73 are provided at both ends of shaft 81 to mount the ends of the shaft respectfully, to the key 64 of the valve and the handle 71. Pins 73 may be rivets or removable cotter sufficiently long such that the second end and consequently the handle 71 extends past the side of the pipe bracket 2 to allow access from the side similar to that shown in U.S. Pat. No. 5,478, 142.

A bushing or grommet 84 pivotally mounts the shaft 81 to a handle bracket 85. The handle bracket 85 includes a first flange portion 86 which receives the bushing or grommet 84 and a second flange portion 87 which is mounted to the control valve and connected to the first flange portion 86 by an intermediate flange 88. As illustrated in FIG. 4, the flange 87 is connected to the pipe bracket by fasteners 12 which connect the pipe bracket 2 to the mounting bracket 6.

A modification of the handle bracket 85 is illustrated in FIG. 5. The flange 87 is mounted to the control valve at the mounting lugs 8 by the same fasteners 10 (not shown in FIG. 5) that mount the control valve to the car body. The structure of the extension shaft 81 and its relationship to the handle 71 and the valve element as well as its pivotal connection to flange 86 of the bracket 85 is the same as that in FIG. 4.

A third connection of the bracket 85 is illustrated in FIG. 6. The flange 87 mounts the bracket 85 at the port 74 for the cut-off valve using the fasteners (not shown) which mounts the cut-off valve to the pipe bracket 2. Also, the handle 71 is shown as L-shaped and extending from the shaft 81 toward the pipe bracket 2. This provides access to the handle 71 at the side of and closer to the front face of the pipe bracket 2. Again, the structure of the extension shaft 81 and its relationship to the pivotal mounting to flange 86 and bracket 85 is the same as in the previous two drawings.

Figure 7:
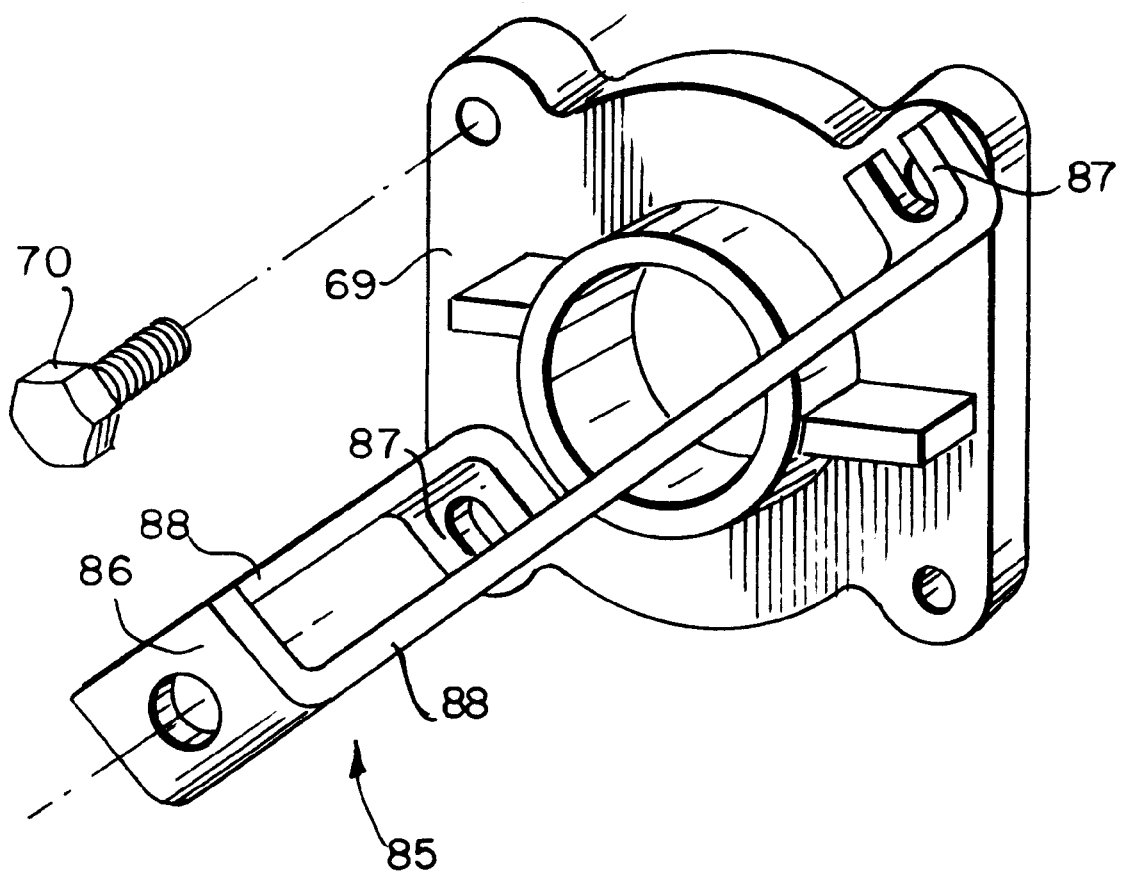
FIG. 7 is a perspective view of a handle bracket mounted to a valve cover according to the principles of the present invention.

A fourth connection of the bracket 85 is illustrated in FIG. 7. The flanges 87 mount the bracket 85 to the cover 69 of the manual valve using the fasteners 70, extending into the body, which connects the cover 69 to the body of the valve, not shown. A pair of intermediate flanges 88 connect the flange portions 87 to a single flange member 86 which pivotally receives the extension shaft 81, not shown. Thus, the handle bracket 85 is mounted to the control valve via the manual valve.

As previously discussed, the present invention may be applied to retrofit existing valves or may be provided as a complete unit with a control valve. The use of the extension shaft 81 may be used with other manual valves in railroad systems and appropriate bracket 85 provided to position, secure and stabilize the extension shaft 87 with respect to the valve or the car body.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake control valve having a manual valve mounted on a face of a pipe bracket and at least one mounting bracket for mounting the control valve to a rail vehicle, the manual valve comprising:

a body and a cover secured to the body by fasteners;

a stem connected to a valve element;

a handle bracket mounted to the manual valve by fasteners that connect the cover to the body and thus the handle bracket is mounted to the control valve by the manual valve;

an extension shaft coupled to the stem at a first end of the shaft and pivotally coupled to the handle bracket; and a handle coupled to a second end of the shaft.

2. A brake control valve according to claim 1, wherein the second end of the extension extends past a side of the pipe bracket.

3. A brake control valve according to claim 1, wherein the stem has a key and the handle has an opening for mating with the key; and the first end of the of the shaft mates with the key and the second end of the shaft mates with the opening of the handle.

4. A brake control valve according to claim 3, wherein the handle assumes the same open and closed positions mated to the shaft as it would mated to the stem.

5. A brake control valve according to claim 1, wherein the handle is L-shaped and extends from the coupling to the second end of the shaft towards the pipe bracket.

6. A brake control valve having a manual valve mounted on a face of a pipe bracket, the manual valve comprising:

a stem connected to a valve element and having a key;

a handle having an opening for mating with the key;

an extension shaft having a first end mating with the key of the stem and having a second end mating with the opening of the handle, a handle bracket mounted to the manual valve at one end of the handle bracket using fastners, extending into the body, to connect the handle bracket to the manual valve; and, the shaft being pivotally mounted at a second end of the handle bracket.

7. A brake control valve according to claim 6, wherein the second end of the extension extends past a side of the pipe bracket.

8. A brake control valve according to claim 6, wherein the handle assumes the same open and closed positions mated to the shaft as it would mated to the stem.

9. An extension kit for a manual valve to be mounted on a face of a pipe bracket of a brake control valve, the manual valve including a stem connected to a valve element and having a key, the manual valve also including a handle having an opening for mating with the key, the kit comprising:

an extension shaft having a first end configured to mate with the key of the stem and having a second end configured to mate with the opening of the handle; and a handle bracket for pivotally receiving the extension shaft wherein the handle bracket is configured to be mounted to the manual valve using fasteners, extending into the body, to connect the handle bracket to the manual valve.

10. A brake control valve according to claim 9, wherein the shaft is configured such that the second end of the extension extends past a side of the pipe bracket.

11. A brake control valve according to claim 9, wherein the shaft is configured such that the handle assumes the same open and closed positions mated to the shaft as it would mated to the stem.

* * * * *